(12) United States Patent
Takeuchi et al.

(10) Patent No.: US 8,729,409 B2
(45) Date of Patent: May 20, 2014

(54) WIRE-GUIDING PORTION WITH STRUCTURE FOR PREVENTION OF DISPLACEMENT OF TAPE

(75) Inventors: Kunihiko Takeuchi, Makinohara (JP); Takeshi Onoda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 85 days.

(21) Appl. No.: 13/449,388

(22) Filed: Apr. 18, 2012

(65) Prior Publication Data

US 2012/0267163 A1 Oct. 25, 2012

(30) Foreign Application Priority Data

Apr. 20, 2011 (JP) ................................. 2011-093969

(51) Int. Cl.
*H02G 3/18* (2006.01)
(52) U.S. Cl.
USPC ............ 174/660; 174/50; 174/72 A; 439/76.2
(58) Field of Classification Search
USPC ........ 174/50, 560, 559, 561, 17 R, 520, 72 A, 174/660; 220/3.2, 3.3, 4.02; 439/76.1, 76.2, 439/949
See application file for complete search history.

(56) References Cited

U.S. PATENT DOCUMENTS

| | | | | |
|---|---|---|---|---|
| 7,422,443 | B2 * | 9/2008 | Kaneko et al. | 439/76.2 |
| 7,622,674 | B2 * | 11/2009 | Kanamaru et al. | 174/50 |
| 8,425,238 | B2 * | 4/2013 | Takeuchi et al. | 439/76.2 |
| 2012/0000686 | A1 * | 1/2012 | Soh et al. | 174/50 |

FOREIGN PATENT DOCUMENTS

| | | |
|---|---|---|
| EP | 2515401 A2 | 10/2012 |
| JP | 2007-028806 A | 2/2007 |
| JP | 2013-150522 A | 8/2013 |

OTHER PUBLICATIONS

The extended European search report dated on Nov. 20, 2013 for corresponding European Patent Application No. 12164427.2.

* cited by examiner

*Primary Examiner* — Angel R Estrada
(74) *Attorney, Agent, or Firm* — Edwards Wildman Palmer LLP

(57) ABSTRACT

A wire-guiding portion includes a rib protruding from an outer surface of the wire-guiding portion for tape slippage prevention. At least a rear end face of the rib defines a sloping surface intersecting at an acute angle with the outer surface at the edge of the electrical wire guiding portion. The wire-guiding portion may be provided obliquely downward with respect to a vertical wall of the electrical junction box body.

3 Claims, 4 Drawing Sheets

WIRE-GUIDING PORTION WITH STRUCTURE FOR PREVENTION OF DISPLACEMENT OF TAPE

CROSS REFERENCE TO RELATED APPLICATION

The priority application Japan Patent Application No. 2011-093969 upon which this patent application is based is hereby incorporated by reference.

BACKGROUND OF THE INVENTION

1. Field of the Invention

The invention relates to a structure in a functional portion in an electrical junction box of a vehicle such as an automobile, the functional portion adapted for guiding an electrical wire, the structure being adapted to prevent displacement of a tape that is wound around the functional portion to secure a wiring harness thereto.

2. Description of the Related Art

Various types of wire-guiding portions have been advocated in the art, the portions being adapted to secure a wiring harness, which may comprise a plurality of electrical wires, to a wire-guiding portion in an electrical junction box by winding a tape around it.

Japanese Patent Application Laid-Open Publication No. 2007-28806 (FIGS. 1 and 2) discloses a state of the art configuration of an electrical junction box that includes a lower case into which a connection block is inserted, the connection block having electrical components such as a fuse and a relay connected thereto. The state of the art electrical junction box further includes an upper case attached to the lower case.

A wire-guiding portion of this conventional junction box is constructed by (a) an inverted gutter-like upper securing piece provided on the connection block and (b) a gutter-like lower securing piece provided on the lower case. The electrical wires each connected to corresponding each of electrical components of the connection block are placed in the form of a wiring harness and inserted into and passed through the space between the upper securing piece and the lower securing piece. The wiring harness is secured by means of winding of a tape to the upper securing piece and the lower securing piece.

In addition to the above example, FIG. 5 illustrates another example of a conventional tape-winding-purpose wire-guiding portion structure. This structure is described in the context of an electrical junction box that comprises a frame 31 accommodating a not-shown connection block and a lower cover 32 attached to the frame 31, and a not-shown upper cover attached to the frame 31.

The frame 31 includes an inverted gutter-like wire-guiding wall 33. The lower cover 32 includes a plate-like wire-supporting wall 34 opposed to the lower portion of the wire-guiding wall 33. At least the outer surface of the wire-guiding wall 34 includes a tape slippage prevention rib 35 that protrudes therefrom. The rib 35 includes the front-side sloping surface 35a and the rear-side tape hooking purpose vertical surface 35b.

A plurality of electrical wires each continuing to electrical components of the not-shown connection block are placed in the form of a wiring harness, and they are guided to an outside along the wire-guiding portion 36 constituted by the wire-guiding wall 33 and the wire-supporting wall 34. The tape is wound around the wiring harness along the outer surface of the wire-guiding portion 36 and the outer surface of the rib 35 radially thereof, and the wiring harness is secured to the wire-guiding portion 36. Further, the space between the wire-guiding portion 36 and the wiring harness is made waterproof.

In the case of the state of the art tape-displacement-preventing structure for the conventional wire-guiding portion shown in FIG. 5, the rear end face (tape hooking surface) 35b of the tape slippage prevention purpose rib 35 intersects with the outer surface of the wire-guiding wall 33 as indicated by the chained line. Also, the wire-guiding portion 36 is provided obliquely downward.

Accordingly, in cases where large vibration while a vehicle is running acts thereupon or a large pulling force acts upon the wiring harness, the tape may be displaced frontward (toward the edge of the wire-guiding portion 36). Occurrence of the tape displacement decreases the securing force of the wiring harness, and water may enter the inside of the wire-guiding portion 36 via the space created by the displaced wound tape.

In view of the above-identified problem, it can be seen that there is a need to provide a wire-guiding portion with a tape-displacement-preventing structure or feature that allows for effective prevention of tape displacement in the wire-guiding portion due to vibrations and pulling of the wiring harness, and, in addition, effective prevention of the tape displacement even when the wire-guiding portion is arranged obliquely downward.

SUMMARY OF THE INVENTION

In one aspect, the invention is a wire-guiding portion guiding an electrical wire, comprising a structure for preventing displacement of a tape wound around the wire-guiding portion, the structure including at least one rib protruding from an outer surface of the wire-guiding portion; the at least one rib including at least a rear end face defining a sloping surface intersecting with the outer surface of the guiding portion at a front end thereof, the rib being adapted to prevent slippage of the tape.

Given the above-defined configuration, when the electrical wires (which may constitute a wiring harness) are inserted into and passed through the wire-guiding portion and the electrical wires are secured to the wire-guiding portion by means of the tape wound therearound, the hook-like rib to serves as a functional portion adapted for hooking of the tape, and the tape is hooked on the rear end face of the rib so that the frontward displacement of the tape is prevented.

Preferably, the wire-guiding portion is frontward obliquely provided with respect to a vertical wall portion of an electrical junction box, and at least the rear end face of the at least one rib is provided in parallel with the vertical wall portion.

The wire-guiding portion is downward oblique, and the tape wound around the wire-guiding portion is apt to be frontward displaced. However, given the above-defined configuration, displacement of the tape is effectively prevented by virtue of the rear end face of the rib. Also, when the electrical junction box body, the wire-guiding portion, and the rib are integrally resin-molded, the direction in which the electrical junction box body is taken out of a mold coincides with the direction in which the rib is taken out of the mold. Accordingly, they can be readily taken out of the mold.

Preferably, the wire-guiding portion includes an upper wall portion and a lower wall portion. The at least one rib may protrude from one of the upper and lower wall portions, and the structure may further include a second rib protruding from an other of the upper and lower wall portions, the second rib having a rear end face parallel to the rear end face of the at least one rib.

In accordance with the above-defined configuration, tape-winding operation can be performed smoothly without interference with regard to the upper and lower ribs (first and the second ribs) having the parallel rear end face, i.e., the tape hooking surface.

BRIEF DESCRIPTION OF THE DRAWINGS

These and other objects, features, and advantages of the present invention will become more apparent upon reading of the following detailed description along with the accompanied drawings, in which.

DESCRIPTION OF THE EXEMPLARY EMBODIMENT

One embodiment of the invention is described hereinbelow with reference to FIGS. 1 to 4, which depict a functional section adapted for guidance of an electrical wire (hereafter this functional section is called "wire-guiding portion") having a structure configured for protecting a tape (which will be later described) against being inadvertently taken out of its intended position (hereafter called "tape-displacement-preventing structure").

Figure 1:
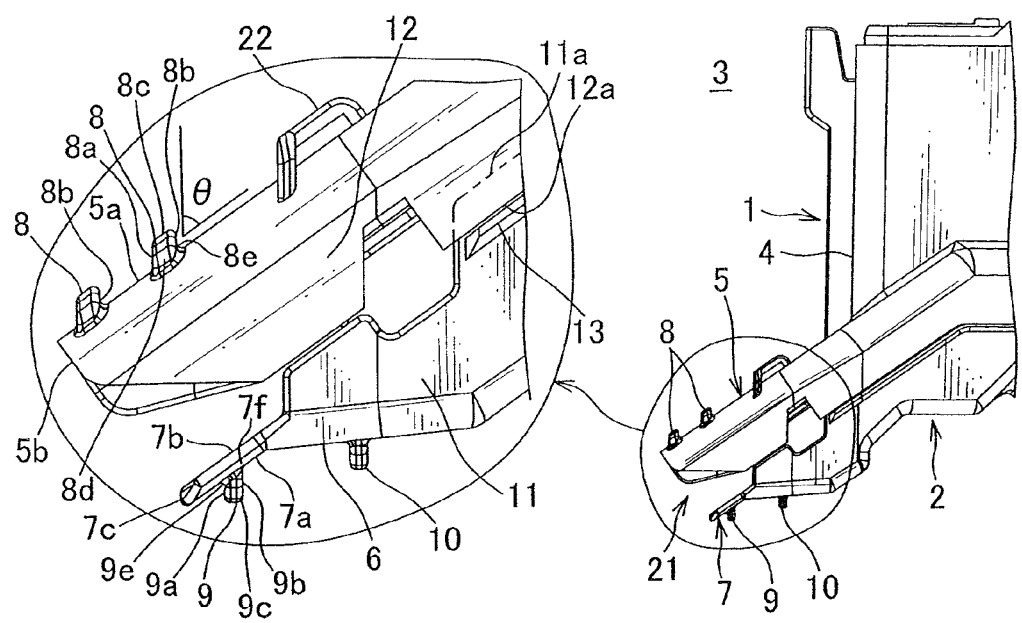
FIG. 1 is a side view of a wire-guiding portion with a feature for preventing displacement of a tape according to one embodiment of the invention with an enlarged view of a principal part illustrated in the circle.

Referring first to FIG. 1, there is partly depicted an electrical junction to box 3. The electrical junction box 3 comprises (A) a frame 1 having a vertical sidewall 4 and (B) a lower cover 2 having a bottom wall 6.

The frame 1 is a body of the electrical junction box 3. The frame 1 and the lower cover 2 are both made of synthetic resin.

The vertical sidewall 4 of the frame 1 includes a wire-guiding wall 5 that has a shape of an inverted gutter and protrudes obliquely downward therefrom.

The bottom wall 6 of the lower cover 2 includes a wire-supporting wall 7 protruding obliquely downward therefrom. The bottom wall 6 is provided beneath and opposed to the wire-guiding wall 5.

The wire-guiding portion 21 is constructed by (a) the upper inverted-gutter-like wire-guiding wall 5 and (b) the wire-supporting wall 7.

It is contemplated here that the wire-guiding wall 5 corresponds to an "upper wall portion" in the context of the appended claims. Likewise, the wire-supporting wall 7 corresponds to a "lower wall portion" in the context of the appended claims. Also, the vertical sidewall 4 corresponds to a "vertical wall portion" in the context of the appended claims.

Still referring to FIG. 1, the tape-displacement-preventing structure is constituted by (i) a plurality of ribs 8 provided on a sloping upper surface 5a of the wire-guiding wall 5, and (ii) one rib 9 provided on an oblique lower surface 7a (outer surface) of the wire-supporting wall 7. It should be noted that the sloping upper surface 5a corresponds to an "outer surface" in the context of the appended claims. The one rib 9 corresponds to a "second rib" in the context of the appended claims.

The ribs 8 protrude upward vertically (or perpendicularly) from the upper surface 5a. The ribs 8 are configured for prevention of slippage of the tape. It is contemplated that there are provided two ribs 8 in this illustrative embodiment, i.e., front and rear ribs 8.

The rib 9 protrudes vertically downward from the lower surface 7a. The rib 9 is also configured for prevention of slippage of the tape.

Still referring to FIG. 1, the ribs 8 of the wire-guiding wall 5 each include (a) vertical (perpendicular) front end face 8a, (b) a vertical (perpendicular) rear end face 8b, (c) an upper end face 8c continuing to the front end face 8a and the rear end face 8b in a sloping manner (or obliquely downward), and (d) right and left curved or tapered end face 8d.

The front end face 8a and the rear end face 8b intersect at an acute angle θ with the upper surface 5a of the wire-guiding wall 5. Since the rear end face 8b serves as a rib-hooking surface, the angle θ defined by the rear end face 8b and the upper surface 5a of the wire-guiding wall 5 is in particular an acute angle.

When it is assumed that the upper surface 5a defines a horizontal plane, the rear end face 8b takes a shape of a sloping surface. The rear end face 8b of the rib 8 extends in parallel with the vertical one sidewall 4 of the frame 1.

In view of the stiffness of the rib 8 and the efficiency in forming the component through resin-molding (this efficiency may be called die releasing property), the intersecting portion between the rear end face 8b and the upper surface 5a has a small curved surface 8e.

In the resin molding operation, the frame 1 is to be taken out of a mold upward in a vertical direction. Likewise, in the resin molding of the ribs, which may apparently be expressed as the resin molding of the wire-guiding wall 5, the ribs are to be taken out of the mold upward in the same vertical direction. It is contemplated that the sidewall 4 of the frame 1, the wire-guiding wall 5, and the ribs 8 are resin-molded integrally in one piece with each other.

The front rib 8 is provided near an edge 5b (which corresponds to a "front end" in the context of the appended claims) of the wire-guiding wall 5. The rear rib 8 is spaced from the front rib 8 to an extent that is slightly larger than the width of the tape (not shown). The amount of heightwise protrusion of the ribs 8 may be half the pitch of the front and rear ribs 8.

Still referring to FIG. 1, the wire-supporting wall 7 is thinner than the wire-guiding wall 5 so as to have flexibility in its width direction. In the free state (in which the tape is not wound), a lower surface 7a (outer surface) and an upper surface 7b (inner surface) of the wire-supporting wall 7 are arranged horizontally with respect to the upper surface 5a (outer surface) and the lower surface (inner surface) of the wire-guiding wall 5.

The rib 9 of the wire-supporting wall 7 is arranged horizontally with respect to the rib 8 of the wire-guiding wall 5. The thickness of the rib 9 is generally half the thickness of the ribs 8 of the wire-guiding wall 5. The heightwise amount of protrusion (length) of the rib 9 is the same as that of the heightwise amount of protrusion (length) of the ribs 8.

A front end face 9a and a rear end face 9b (which is a tape hooking surface) of the rib 9 each protrude vertically and are arranged in parallel with each other. A lower end face 9c connecting the front end face 9a to the rear end face 9b extends horizontally.

The rear end face 9b of the rib 9 intersects with the lower surface 7a of the wire-supporting wall 7 at an obtuse angle.

The front end face 9a of the rib 9 intersects with the lower surface 7a of the wire-supporting wall 7 at an acute angle. The intersecting region between the front end face 9a and the lower surface 7a defines a small curved surface 9e.

Still referring to FIG. 1, with reference to a virtual vertical line (e.g., the outer surface of the sidewall 4 of the frame 1), an edge 7c (front end) of the wire-supporting wall 7 is provided more rearward than the edge 5b (front end) of the wire-guiding wall 5. The rib 9 of the wire-supporting wall 7 is provided slightly more rearward of the rear rib 8 of the wire-guiding wall 5. A base end if of the rib 9 of the wire-supporting wall 7 is provided generally at a centre of the wire-supporting wall 7 in its length direction, the base end 7f being an upper end which is a region where the rib 9 intersects with the wire-supporting wall 7.

The wire-supporting wall 7 continues to the bottom wall 6 and right and left sidewall 11 of the lower cover 2. A rear rib 10 is provided downward pendently from the horizontal portion (also indicated by the same reference sign 6) of the bottom wall 6. The rear rib 10 is slightly more elevated than the front rib 9 and arranged horizontal to the front rib 9. The horizontal bottom wall 6 does not have flexibility. When the bottom wall 6 is regarded as a part of the wire-supporting wall 7, then the wire-supporting wall 7 has a bent shape via the front-side sloping portion (7) and the rear-side horizontal portion (6) and takes an obtuse V-shape.

The sidewall 11 is extended backward upward in conjunction with the bottom wall 6. Rearward of the rear rib 10, an upper end portion 11a of the sidewall 11 enters the wire-guiding wall 5 along the inner surface of the vertical sidewall 12 of the wire-guiding wall 5 with a stopper protrusion 13 of the outer surface of the sidewall 11 brought into abutment on a lower end 12a of the sidewall 12 of the wire-guiding wall 5.

Figure 2:
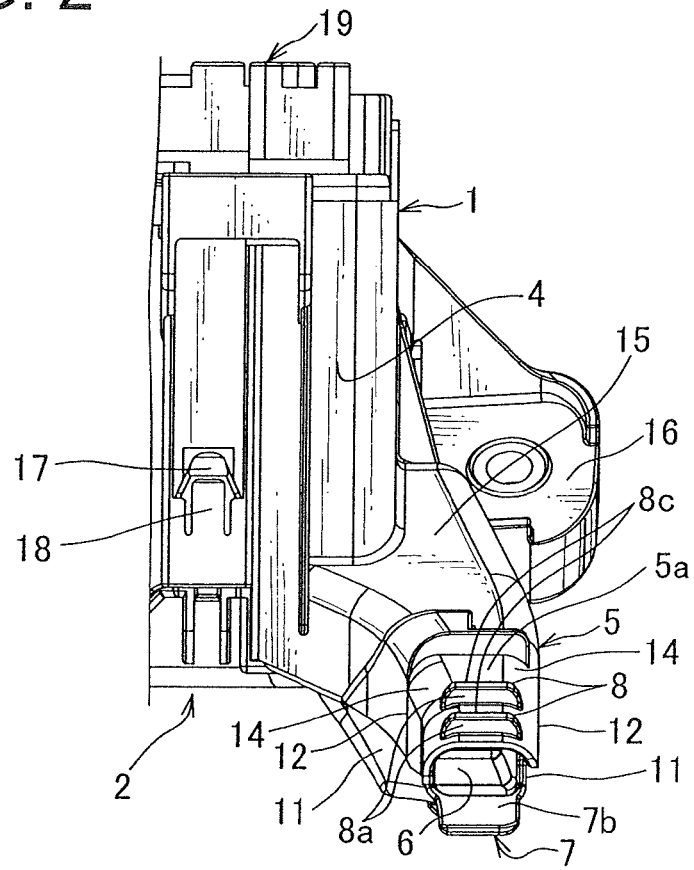
FIG. 2 is a front view of the tape-displacement-preventing structure for the wire-guiding portion.

Referring to FIG. 2 that depicts a front view, the wire-guiding wall 5 comprises (a) the right and left vertical sidewalls 12, (b) the frontward downward upper wall 5a, and (b) a curved wall portion 14 at an intersecting region between the upper wall 5a and the sidewall 12.

The front and rear ribs 8 in parallel with each other of the wire-guiding wall 5 has the same or similar length from the upper wall 5a toward the right and left curved wall portion 14. When viewed in FIG. 2 depicting a plan view, there are identified the vertical front end face 8a and the horizontal upper end face 8c of the ribs 8. The base-end-side portion 15 of the wire-guiding wall 5 continues in one piece to the sidewall 4 of the frame 1 and a bracket 16 for fixation.

Still referring to FIG. 2, the lower cover 2 is brought into engagement with the frame 1 by means of locking elements (e.g., engagement of a locking frame piece 17 with a flexible locking nail 18).

The inner surface 7b of the wire-supporting wall 7 is arranged frontward downward beneath the upper wall 5a of the wire-guiding wall 5, the inner surface of the horizontal bottom wall 6 continues to the rear portion of the inner surface 7b. The right and left sidewalls 11 are each arranged at both sides of the bottom wall 6. The top portion of a connection block 19 accommodated in the frame 1 is exposed to an upper space with respect to the frame 1.

Figure 3:
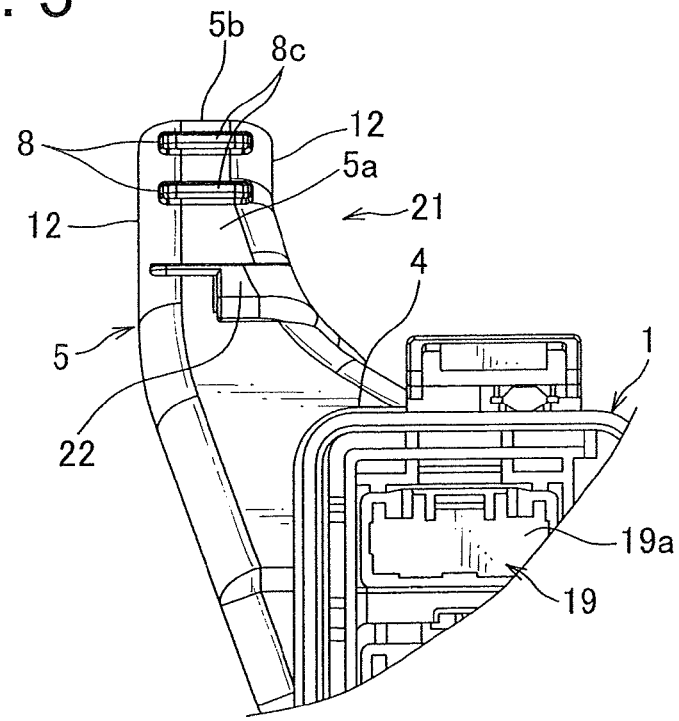
FIG. 3 is a plan view of the tape-displacement-preventing structure for the wire-guiding portion.

Referring to FIG. 3 that depicts a plan view, the front and rear ribs 8 are provided at the upper wall 5a of the frontward downward wire-guiding wall 5 of the frame 1, the front and rear ribs 8 upstanding therefrom vertically (perpendicularly) and in parallel with each other. A virtual extended plane in the right-and-left direction of each of the ribs 8 intersects with an upward virtual extended plane of the right and left sidewall 12 of the wire-guiding wall 5. When viewed in FIG. 3 depicting the plan view, there is identified an upper end face 8c of the ribs 8 taking a frontward downward sloping shape.

The connection block 19 is accommodated in the space defined by the peripheral wall of the frame 1 which is defined by the vertical four sidewalls 4 (the peripheral wall is also indicated by the reference sign 4). The connection block 19 has on its top portion a connector portion 19a, a fusible link (fuse) mounting portion, and a relay mounting portion.

A plurality of electrical wires 20 (wiring harness) (see also FIG. 4), which continue to the terminals connected to the connector, the fusible link (fuse), and the relay, are guided out of the wire-guiding portion 21 comprising the wire-guiding wall 5 and the wire-supporting wall 7. In this exemplary embodiment, the wiring harness 20 is secured by a not-shown banding band to the wire-guiding wall 5. In FIGS. 1 and 3, a banding band insertion portion is indicated by the reference sign 22.

Figure 4:
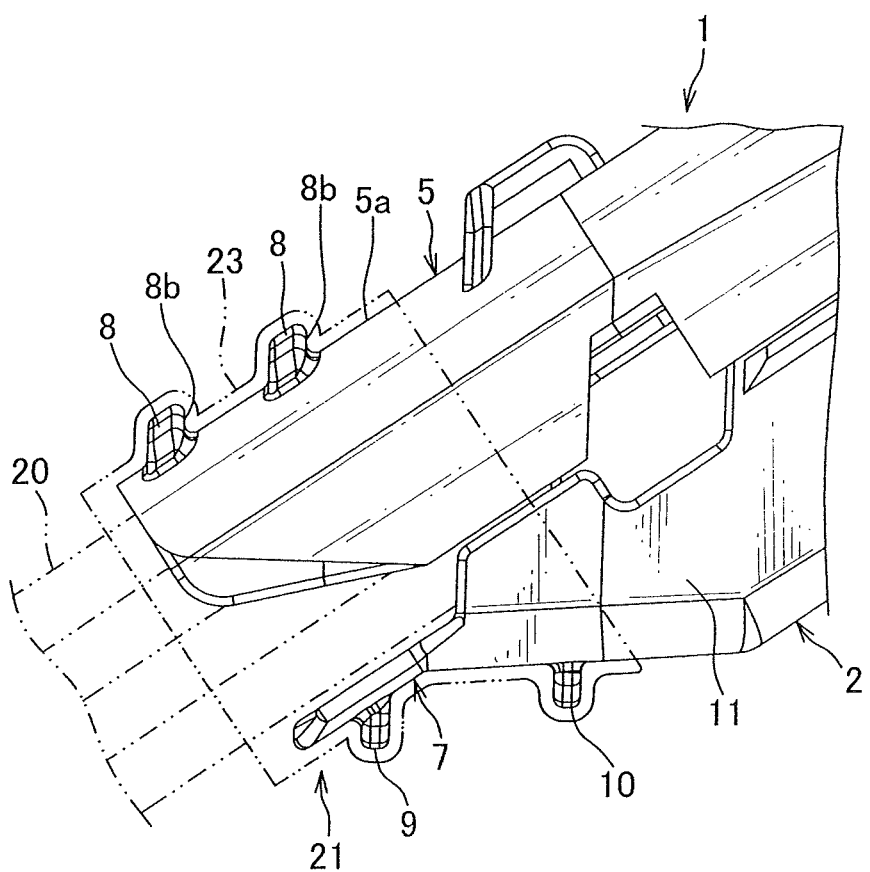
FIG. 4 is a side view where the wire-guiding portion is wound by a tape illustrated with a chained line.
Figure 5:
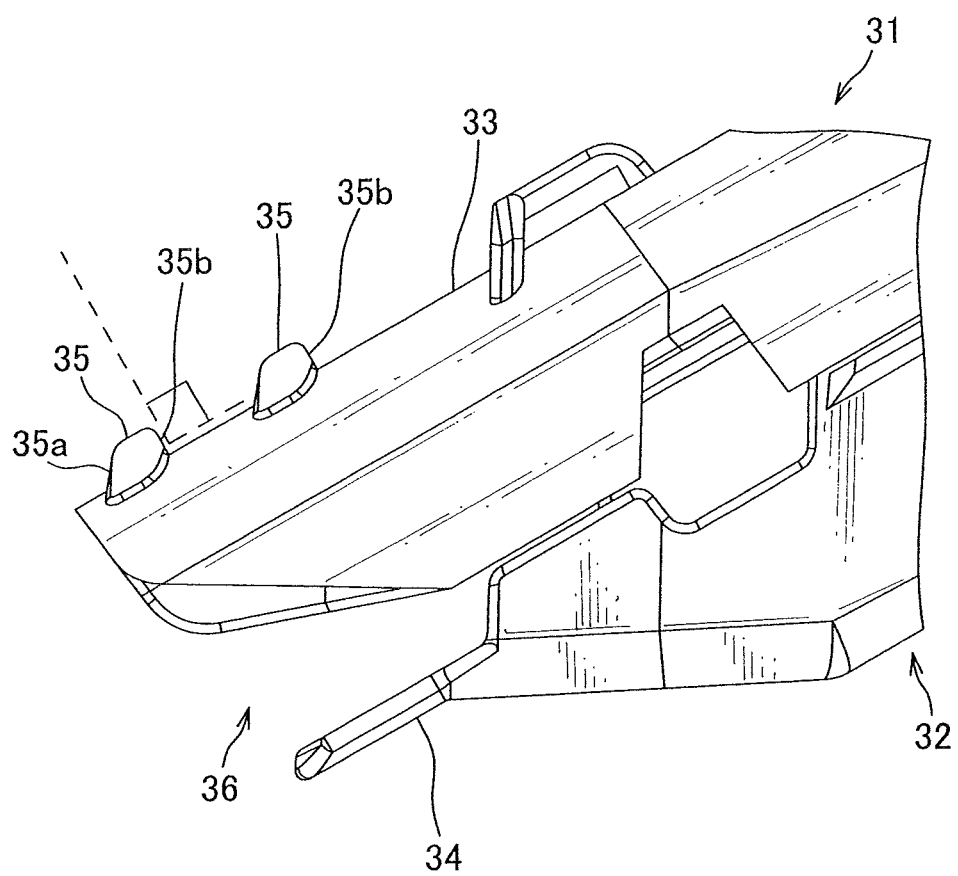
FIG. 5 is a side view of a principal part of an exemplary tape-displacement-preventing structure in a conventional wire-guiding portion.

Referring to FIG. 4, the plurality of electrical wires 20 (constituting the wiring harness) are passed through the wire-guiding portion 21, which comprises the wire-guiding wall 5 and the wire-supporting wall 7 as described in the foregoing, and a single-faced adhesive resin tape 23 is wound around the wiring harness 20 and the wire-guiding portion 21.

In this illustrative embodiment as described in the foregoing in detail, the rear end faces 8b of the ribs 8 of the wire-guiding wall 5 is positioned vertically (perpendicularly) with respect to the frontward downward upper wall surface 5a of the wire-guiding wall 5, and the ribs 8 protrude from the upper wall surface 5a in a hook-like manner. Accordingly, the tape 23 is strongly hooked by the rear end faces 8b of the ribs 8 so that the displacement (and detachment) of the tape 23 due to vehicle's vibration and pulling of the electrical wire 20 is effectively prevented.

Also, since the front and rear ribs 9, 10 of the wire-supporting wall 7 are arranged in parallel (uneven parallel) with the ribs 8 of the wire-guiding wall 5, the tape-winding operation can be smoothly performed. Further, since the rib 8 of the wire-guiding wall 5 protrudes in the same direction (vertical direction) as that of the vertical sidewall 4 of the frame 1 (see FIG. 1), the frame 1 in one piece with the wire-guiding wall 5 can be smoothly taken out of the mold without being caught thereby. Likewise, since the rib 9 of the wire-supporting wall 7 protrudes in conjunction with the rear rib 10 in the same direction (vertical direction) as that of the vertical sidewall 11 of the lower cover 2, the lower cover 2 integral with the wire-supporting wall 7 can be smoothly taken out of the mold in the resin-molding operation without being caught thereby.

Although the above-described embodiment uses the thin and flexible wire-supporting wall 7, the wire-supporting wall 7 may be thick without flexibility. Also, it is contemplated in an inverted view of FIG. 1 that the frame 1 may comprise the plate-like wire-supporting wall 7, and the lower cover 2 may comprise the gutter-like wire-guiding wall 5. In this case, it is contemplated that there is provided the rib 8 having a rear end face 8b intersecting with the outer surface 7a of the wire-supporting wall 7 at an acute angle, and the outer surface 5a of the wire-guiding wall 5 includes the rib 9 having a rear end face 9b intersecting with the outer surface 5a of the wire-guiding wall 5 at an obtuse angle.

Further, the wire-supporting wall 7 may take a gutter-like shape corresponding to that of the wire-guiding wall 5 and these two elements may be joined together to constitute a cross-sectionally rectangular wire-guiding portion 21.

Referring again to FIG. 1, the rear end face 9b of the rib 9 of the wire-supporting wall 7 may intersect with the outer surface 7a of the wire-supporting wall 7 at an acute angle in a similar manner to rear end face 8b of the rib 8 of the wire-guiding wall. Also, the number of the ribs 8, 9 can be specified as required. For example, the ribs 8 of the wire-guiding wall 5 may be one to three in number, and the rib 9 of the wire-supporting wall 7 may be zero or two in number.

It is also contemplated that the wire-guiding wall 5 and the wire-supporting wall 7 may be provided in one piece with the frame 1 (the same electrical junction box body). Further, the frame 1 may be eliminated and the lower cover 2 (electrical junction box body), the upper cover, and the electrical component mounting portion in the lower cover 2 may be provided in the electrical junction box, in which the wire-guiding portion 21 provided in the lower cover 2 may comprise the upper and/or lower ribs 8 to 10.

Although the above-described embodiment has been described in the context of the electrical junction box 3, the wire-guiding portion 21 may be provided at the end of the prism-like not-shown harness protector (which may comprise the gutter-like protector body and the plate-like cover) for insertion of the plurality of electrical wires 20 (wiring harness) and protection thereof from outside, and the wire-guiding portion 21 may comprise upper and lower ribs 8 to 10 as shown in FIG. 1.

The invention provides a tape-displacement-preventing structure for a wire-guiding portion that is incorporated in a box-shaped body mounted in an automobile such as an electrical junction box and a harness protector. The structure is configured to prevent the displacement of the tape which is used to secure the wiring harness to the wire-guiding portion and waterproof the wiring harness and the wire-guiding portion, the tape being wound around to the wire-guiding portion. By virtue of this structure, it is made possible to increase the strength of securing of the wiring harness and prevent entry of water via the gap created in the displaced wound tape into the inner space of the box-shaped body.

In accordance with the configuration of the above illustrative embodiment, it is made possible to prevent frontward displacement of the tape by the rear end face of the rib of the wire-guiding portion by which the tape is hooked. Thus, it is made possible to prevent reduction in the securing force of the electrical wires (or the wiring harness) to the wire-guiding portion due to the tape displacement, and prevent entry of water via the gap created in the wound tape into the inner space of the wire-guiding portion.

Also, even when the wire-guiding portion is provided obliquely downward causing the tape to be readily displaced toward the edge of the wire-guiding portion, the rib allows for effective prevention of the tape displacement, increasing the effects attained by the first aspect.

In addition, in integral resin-molding of the electrical junction box body, the wire-guiding portion, and the rib, it is made possible to take the electrical junction box body and the rib out of the mold smoothly in the same direction and thus improve flexibility in resin-molding operation.

Further, the tape-winding operation can be performed for the parallel rear end face, i.e., the upper and lower ribs having tape hooking surface without interference and smoothly, and thus the tape-winding operation can be improved.

Hereinabove, while the invention has been particularly shown and described with reference to exemplary embodiments thereof, it will be understood by those skilled in the art that these and other changes, modifications, and substitutions in form and details may be made therein without departing from the spirit and scope of the invention. Accordingly, it is to be recognized that the scope of the invention is defined and limited only by the claims which follow.

What is claimed is:

1. A wire-guiding portion guiding an electrical wire, comprising a structure for preventing displacement of a tape wound around the wire-guiding portion, the structure including at least one rib protruding from an outer surface of the wire-guiding portion, the at least one rib including at least a rear end face, which is formed on an opposite side of a front end face of the rib, defining a sloping surface intersecting with the outer surface of the wire-guiding portion at a front end at an acute angle thereof, the rib being adapted to prevent slippage of the tape.

2. The wire-guiding portion as set forth in claim 1, wherein the wire-guiding portion is frontward obliquely provided with respect to a vertical wall portion of an electrical junction box, and at least the rear end face of the at least one rib is provided in parallel with the vertical wall portion.

3. The wire-guiding portion as set forth in claim 2, wherein the wire-guiding portion includes an upper wall portion and a lower wall portion, the at least one rib protrudes from one of the upper and lower wall portions, and the structure further includes a second rib protruding from an other of the upper and lower wall portions, the second rib having a rear end face parallel to the rear end face of the at least one rib.

* * * * *